(12) United States Patent
Cain (10) Patent No.: US 9,113,611 B1
(45) Date of Patent: Aug. 25, 2015

(54) ANIMAL RELEASE CHUTE APPARATUS

(71) Applicant: Brian Anthony Cain, Onyx, CA (US)

(72) Inventor: Brian Anthony Cain, Onyx, CA (US)

( * ) Notice: Subject to any disclaimer, the term of this patent is extended or adjusted under 35 U.S.C. 154(b) by 35 days.

(21) Appl. No.: 14/091,293

(22) Filed: Nov. 26, 2013

Related U.S. Application Data (60) Provisional application No. 61/732,318, filed on Dec. 1, 2012.

(51) Int. Cl.
*A01K 15/04* (2006.01)

(52) U.S. Cl.
CPC ........................................ *A01K 15/04* (2013.01)

(58) Field of Classification Search
CPC ............................ A01K 1/0613; A01K 1/0005
USPC ......... 119/427, 516, 519, 522, 523, 524, 752, 119/453, 488, 722, 712, 843
See application file for complete search history.

(56) References Cited

U.S. PATENT DOCUMENTS

| | | | | | |
|---|---|---|---|---|---|
| 13,312 | A | * | 7/1855 | Jenne | 119/523 |
| 1,116,220 | A | * | 11/1914 | Betty | 119/772 |
| 1,438,814 | A | * | 12/1922 | Eckery | 119/722 |
| 1,928,819 | A | * | 10/1933 | Neller | 119/524 |
| 3,195,513 | A | * | 7/1965 | Billhorn | 119/729 |
| 3,276,433 | A | * | 10/1966 | Tougas et al. | 119/722 |
| 3,734,059 | A | * | 5/1973 | Rodrigues | 119/520 |
| 4,048,961 | A | * | 9/1977 | Priefert | 119/752 |
| 4,444,150 | A | * | 4/1984 | Hueftle et al. | 119/522 |
| 5,924,385 | A | * | 7/1999 | Cossel | 119/512 |
| 6,904,869 | B1 | * | 6/2005 | Geisthardt | 119/524 |
| 2010/0242858 | A1 | * | 9/2010 | Swires | 119/712 |
| 2012/0000433 | A1 | * | 1/2012 | Gipson | 119/843 |

* cited by examiner

*Primary Examiner* — Monica Williams
(74) *Attorney, Agent, or Firm* — James M. Duncan, Esq.; Klein DeNatale Goldner (57) ABSTRACT

A portable insert fits within an existing animal release chute to reduce the volume of the pen and thereby provide more confinement for a smaller animal, thereby providing greater safety for the animal. The position of the portable insert may be adjusted with respect to the animal release chute, and mechanisms. Adjustable spacing members maintain the entire insert in fixed position within the chute.

3 Claims, 11 Drawing Sheets

ANIMAL RELEASE CHUTE APPARATUS

CROSS-REFERENCE TO RELATED APPLICATIONS

This is a non-provisional application of U.S. Application No. 61/732,318 filed on Dec. 1, 2012 to which application this inventor claims domestic priority.

BACKGROUND OF THE INVENTION

This invention generally relates to confinement apparatus for livestock and more specifically relates to an apparatus which attaches within an existing animal chute for releasing an animal into an arena, such as a rodeo arena. The prevent invention provides additional confinement within the larger animal chute, providing smooth inside facing surfaces which provide a barrier to structures within the chute which may injure the animal. The present invention further provides an optional pivoting top panel which closes over the animal's head and shoulders, thereby providing further containment of the animal and a sense of security to the animal.

A variety of animals are utilized in rodeos, western shows, livestock competitions, etc. In the various events in which the animals are used, the animals are often released into an arena, corral, ring, etc. (hereinafter "arena") through a "chute." The chute, typically configured as a rectangular pen, typically opens on a long side, with the animal initially standing within the chute with the animal's side facing the arena. Thus, when the gate of the chute opens, the animal pivots to enter the arena. For bull riding events, the chute is referred to as a "bucking chute."

In some livestock competitions, the contestant's score in some events, such as bull riding, includes a factor which takes into consideration the strength of the animal and the animal's style of bucking. For example, in bull riding, a perfect score would be 100 points, based upon two judges who judge both the rider and the bull. Each judge will give up to 25 points to the rider, determined by how much control is shown throughout the eight seconds of the ride. Each judge will give a score of 25 points to the bull, based on his strength and style of bucking. The combined points given by the two judges are added together to determine competitor's score. Thus, certain rodeo events, such as bull riding, require an animal which has been strengthened and trained, which requires a substantial investment in the animal.

The training of an animal, such as a bull, typically begins when the animal is young and not fully grown. The animals may be bred for a variety of different qualities such as extreme strength, temperament, and the ability to jump high and spin fast. Time, patience, skill, and money are critical to the proper training of the animal. The cost of raising bucking bulls can be extensive, especially when the associated the entry fees, vet bills, hauling, insurance, etc. are considered. Thus, the overall investment in the animal, in the breeding, raising and training, can be enormous. A championship animal is extremely valuable and prudence dictates that the animal be reasonably protected from injury through the training process.

The typical bucking chute is approximately eight feet in length and thirty-two inches wide. These dimensions are designed for full grown animals, where the animal, because of its size, has restricted movement within the chute. However, a young animal inside the typical bucking chute has a significant amount of free space which allows significant movement of the animal. The lack of confinement can be detrimental to the animal. The animal has greater room to move, twist, jump, etc., within the chute, which allows the animal to injure itself on the inside of the chute, or to catch limbs within structural members of the chute. The combination of excess movement with the catching of a limb can result in catastrophic injury to the animal, such as breaking of the limb, which renders the animal unfit for competition and resulting in significant loss to the animal owner.

SUMMARY OF THE INVENTION

Embodiments of the method and apparatus disclosed herein provide a solution to the problem described above. The present invention is used in combination with the known animal release chutes, where the animal release chute is of the type comprising a front, a back, a first side and a second side. A four-legged animal may be placed within the release chute with the animal's head facing the front of the chute, wherein the first side is pivotally attached to either the front or the back and may be pivoted from a first closed position in which the first side is parallel to the second side and the animal is confined within the pen to a second open position in which the first side is not parallel to the second side and an opening is formed through which the animal may exit the release chute. The portable insert utilized in combination with the animal release chute comprises a generally vertical front member disposed parallel and adjacent to the front of the release chute and a generally vertical side member which is attached to the front member. The side member may be disposed parallel and adjacent to the second side. To secure the insert within the animal release chutes, the portable insert comprises one or more adjustable spacing members which extend forward of the front member, where the spacing member may telescope forward into engaging contact with the front of the release chute. One or more support hangers are attached to the side member which are use to hang the side member to the second side. The side member comprises spacing members which are positioned in engaging contact with the second side to further secure the insert in place within the chute. The portable insert may further comprise a cover member pivotally attached to the front member, wherein the cover member may be lowered into a generally horizontal position above the location where the animal's head will be positioned.

When the portable insert is positioned within the animal release chute, prior to the opening of the first side, the animal is confined within an enclosure having relatively smooth sides defined by the front member of the portable insert at the head of the animal, the back of the release chute at the rear of the animal, the first side of the release chute positioned at the side of the animal facing the arena, and the side member of the portable insert at the opposite side of the animal.

Embodiments of the disclosed insert may be utilized to effectively reduce the inside space of an animal release chute such that the space is appropriate and safe for the size of the animal. For example, a chute having an eight foot length and thirty-two inch width may be converted, by placement of an embodiment of the disclosed insert, to having effective dimensions (i.e., the space occupied by the animal) of a six foot length and a twenty-four inch width. The disclosed insert is maintained in a fixed position within the chute by the use of hangers which attach the insert to the back side of the chute, and structural spacers which engage the front of the chute and the back side of the chute, while allowing animals to enter through the back of the chute, as per the current practice.

DETAILED DESCRIPTION OF THE EMBODIMENTS

Figure 1:
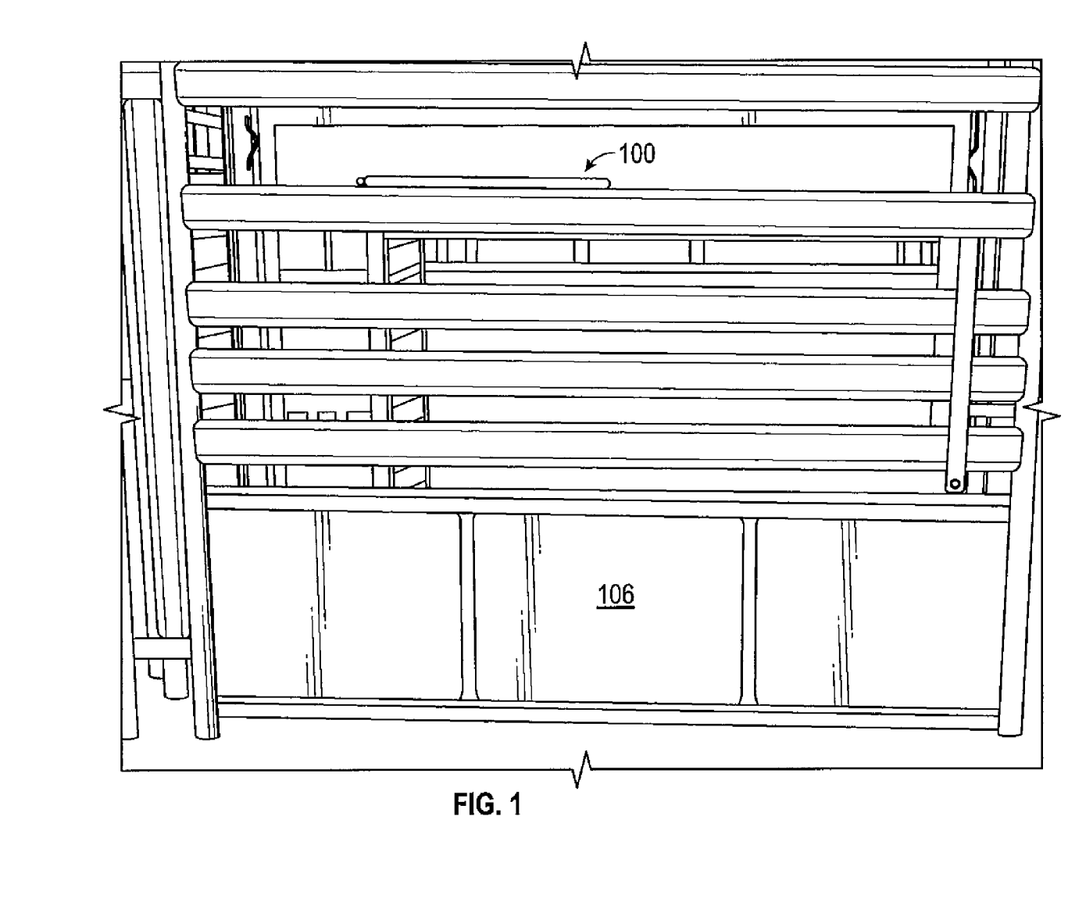
FIG. 1 shows a front view of a known chute utilized for releasing an animal, such as a bull, into an arena.
Figure 2:
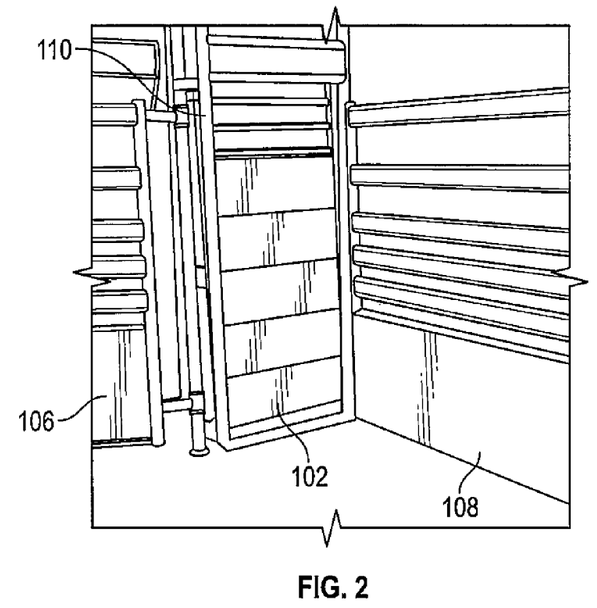
FIG. 2 shows the chute of FIG. 1, with the release gate in an open position, looking toward the front of the chute.
Figure 3:
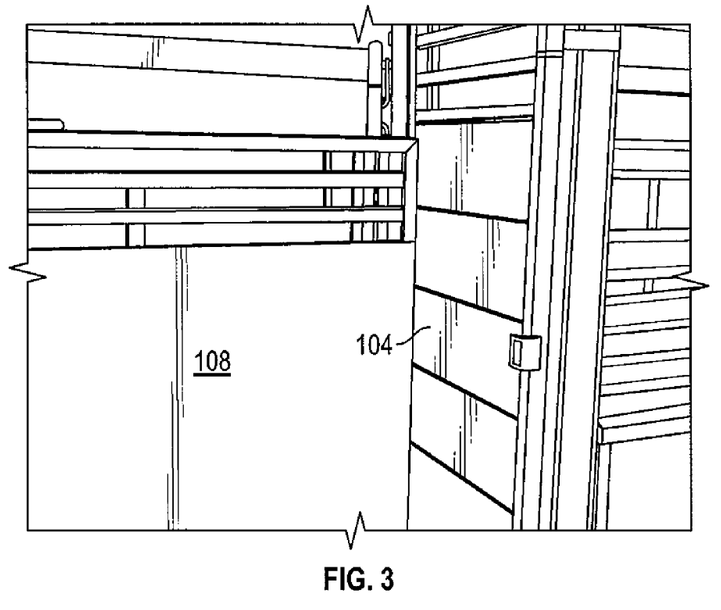
FIG. 3 shows the chute of FIG. 1, with the release gate in an open position, looking toward the back of the chute.
Figure 4:
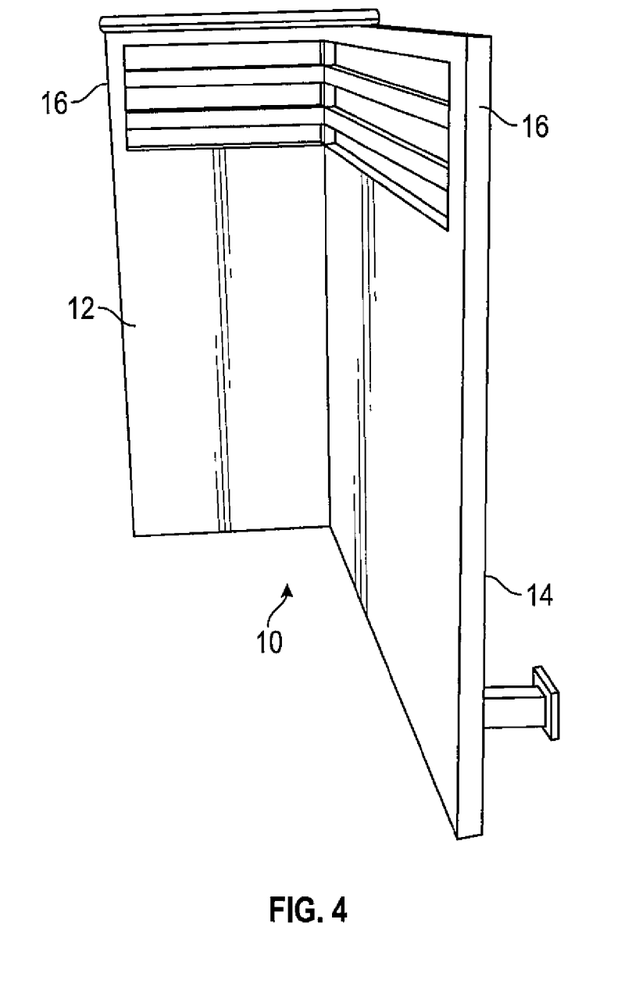
FIG. 4 shows a view of an embodiment of the disclosed invention, looking toward the insides of the front member and the side member.

Referring specifically to the figures, FIGS. 1-3 depict a known chute utilized for releasing an animal, such as a bull, into an arena. The chute 100 comprises a front 102, a back 104, a first side 106 and a second side 108. The chute 100 is typically eight feet in length, which is the typical distance between front 102 and back 104. The chute 100 is typically thirty-two inches wide, which is the typical distance between first side 106 and second side 108. Back 104 will typically pivotally open to allow an animal to be placed within the release chute 100 with the animal's head facing the front 102. First side 106 is pivotally attached to either front 102 or back 104. First 1 shows the first side 106 in a closed position, in which the first side is parallel to the second side 108. FIG. 2 shows the first side 106 pivotally attached to front 102 with pivot 110, with the first side in an open position, where the first side is no longer parallel to the second side 108, such that an animal originally contained within chute 100 may exit the chute through the opening into the arena.

FIGS. 4-10 depict an embodiment of the portable insert 10 before it is placed within the chute 100. The portable insert 10 comprises a front member 12 which is attached to a side member 14. As shown in the figures, the front member 12 and side member 14 form half of a rectangle, such that an approximate right angle is formed between the front member and the side member. As depicted in the figures, the front member 12 and side member 14 may have upper portions 16 which comprise a vertical post-horizontal rail construction such that the insert does not cut off visibility within the chute 100. The upper portions 16 will be positioned sufficiently high on the front member 12 and side member 14 such that an animal cannot easily insert a limb or the animal's head into the openings. However, the lower portions of the front member 12 and side member 14, i.e., the portions below the upper portions 16, preferably have a smooth wall construction on the inside-facing wall, i.e., the surface facing the animal. The smooth wall construction protects the animal from being injured from any structure or surface projecting from the inside-facing wall.

Figure 5:
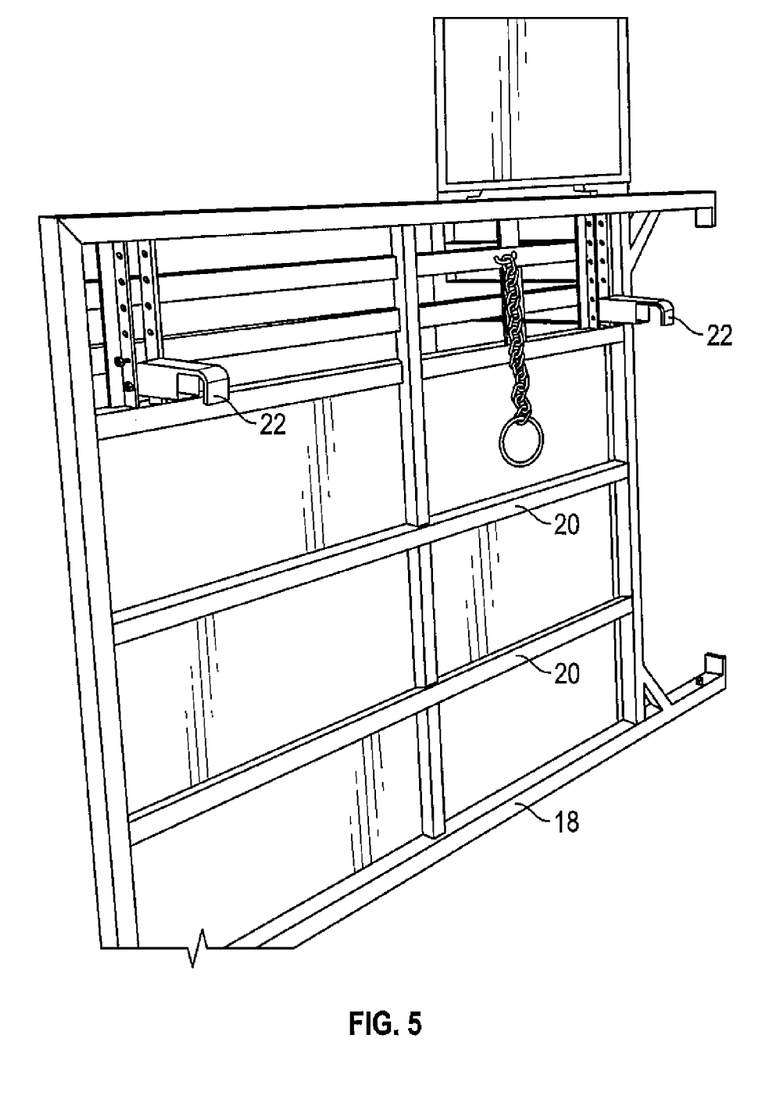
FIG. 5 shows a view of an embodiment of the disclosed invention, looking toward the outside of the side member.

FIG. 5 shows the outside facing wall 18 of the side member 14, showing how structural members 20 may be utilized in the construction of the side member. FIG. 5 also shows the adjustable hangers 22 which are utilized to attach the portable insert 10 to the second side 108 of the chute 100. Adjustable hangers 22 may be vertically repositioned by pins or fasteners which are inserted within openings in a rail member. FIG. 5 also shows an optional lid member 24 which may be pivotally attached to the front member 12. Lid member 24 may be lowered over the animal's head to provide a barrier to vertical movement, provide sense of containment or security to the animal, or to limit the animal's vision while inside the chute 100.

Figure 6:
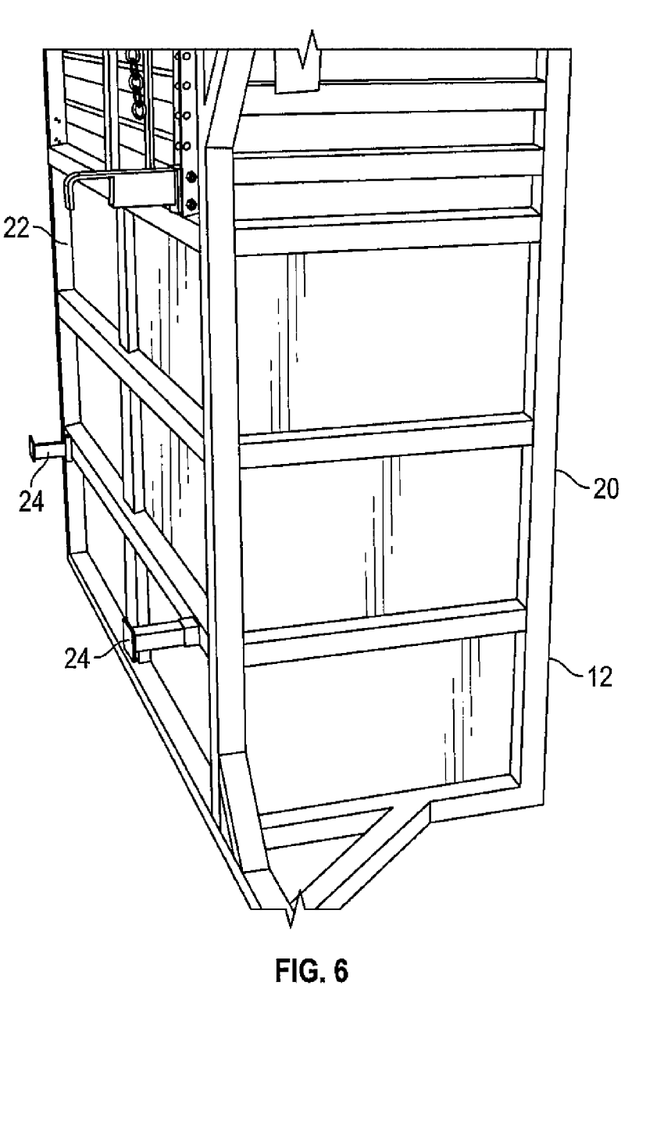
FIG. 6 shows a oblique view of an embodiment of the disclosed invention, looking toward the outside of the front member and the side member.

FIG. 6 shows the portable insert 10 viewed from the outside of the front member 12, showing the use of external structural members 20 to fabricate the front member. FIG. 6 also shows spacing members 24 at the bottom of side member 14. The spacing members 24 are utilized to properly space side member 14 from second side 108, and to rigidly retain the insert 10 in position with respect to the second side.

Figure 7:
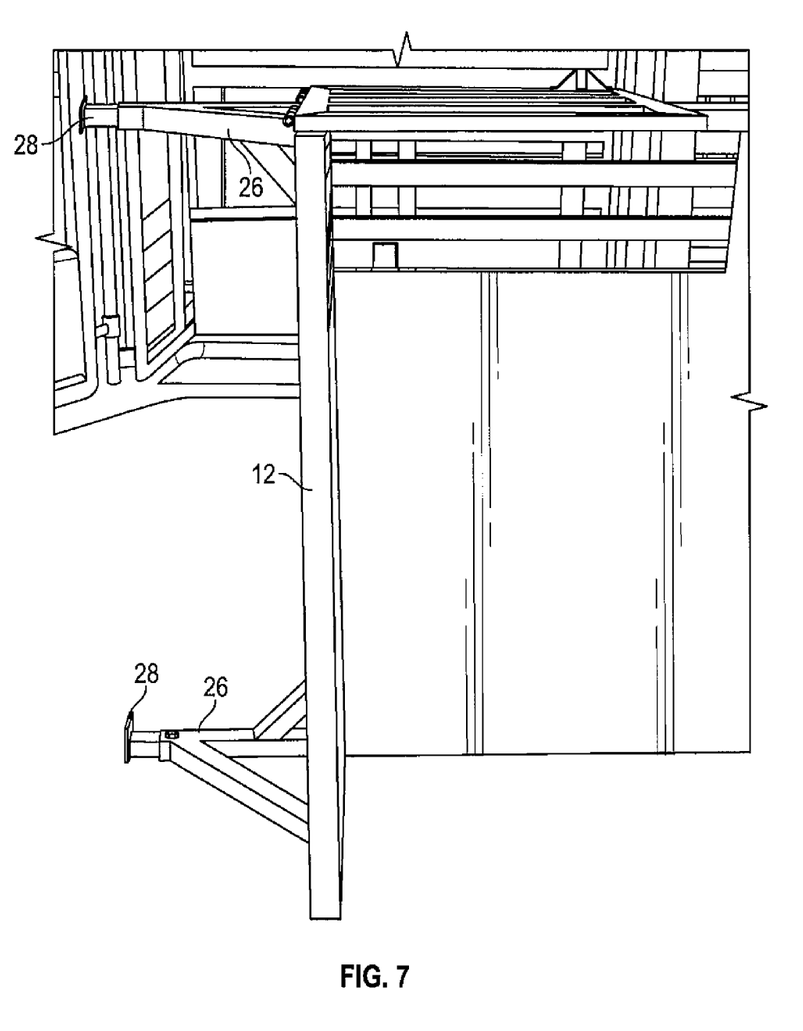
FIG. 7 shows a side view of the front member, showing the bracing members extending forward of the front member.

FIG. 7 shows a side view of the front member 12 of the portable insert 10. As shown in FIG. 7, front member 12 may comprise spacing members 26 which extend forwardly from the front member. The spacing members 26 may each comprise a front portion 28 which is positionable into engaging contact with the front 102 when the portable insert 10 is placed within the chute 100. Spacing members 26 are adjustable such that the standoff between front member 12 and front 102 is maintained in fixed position, with respect to front 102. It is to be appreciated that the spacing members 26 are adjusted when the back end of side member 14 is in engaging contact with back 104, such that adjustment of spacing members 26 rigidly retains the insert in position with respect to front 102 and back 104. When the spacing members 24 and the spacing members 26 are properly positioned, the insert 10 will be locked into position within the chute 100, providing a fixed and rigid structure for containment of the animal.

Figure 8:
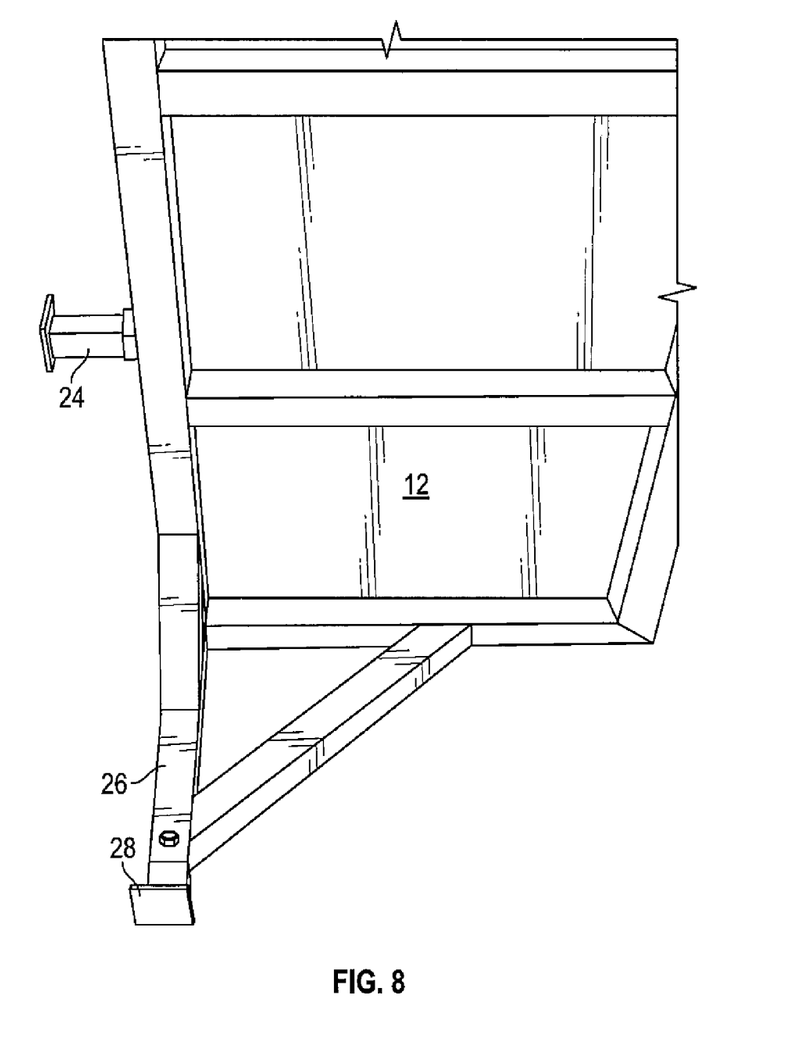
FIG. 8 shows a detailed view of the lower bracing member extending forward of the front member.

FIG. 8 shows the front member 12 viewed from the front, showing greater detail of spacer member 26 located at the bottom of the front member and the front portion 28 which may comprise a flat plate for engagement with front 102. As shown in FIG. 8, spacing member 26 may be made adjustable, such as by utilizing a telescoping construction to allow the front portion 26 to extend forward.

Figure 9:
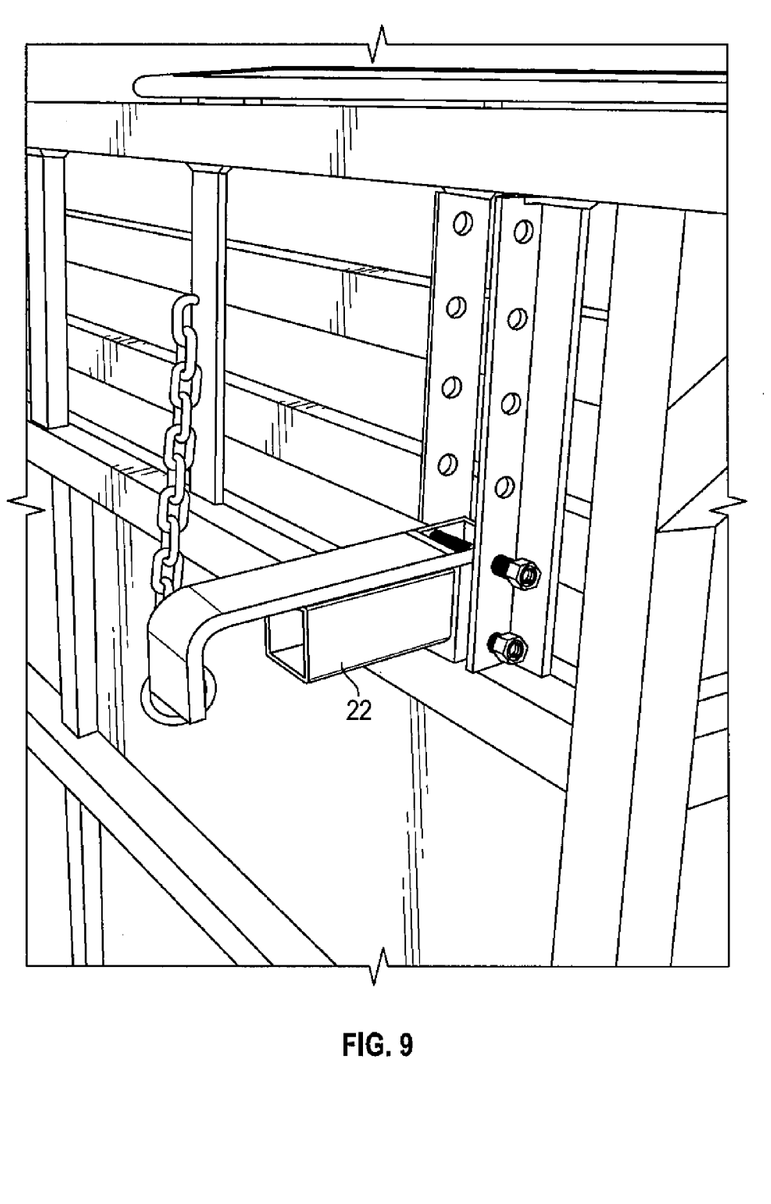
FIG. 9 shows a detailed view of a hanging member extending outwardly from the side member.

FIG. 9 shows a detailed view of a hanger member 22, showing how the vertical position of the hanger member may be adjusted for hanging the insert 10 on second side 108. The adjustability of hanger member 22 allows the adjustment of the vertical position of the hanger member with respect to the various rail configurations which may be present on second side 108.

Figure 10:
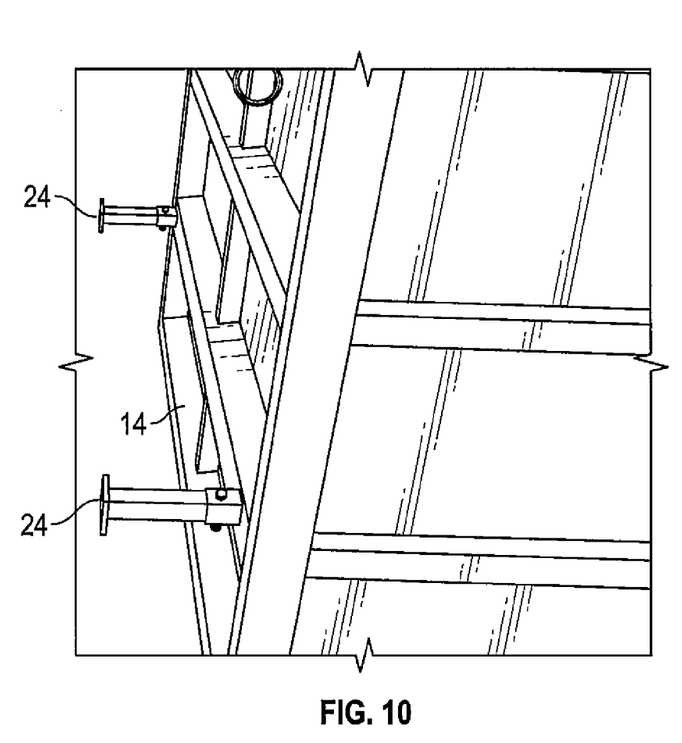
FIG. 10 shows the spacing members extending outwardly at the lower portion of the side member.

FIG. 10 shows another view of side member 14, showing how spacing members 24 may be located for engagement with the bottom portion of second side 108.

Figure 11:
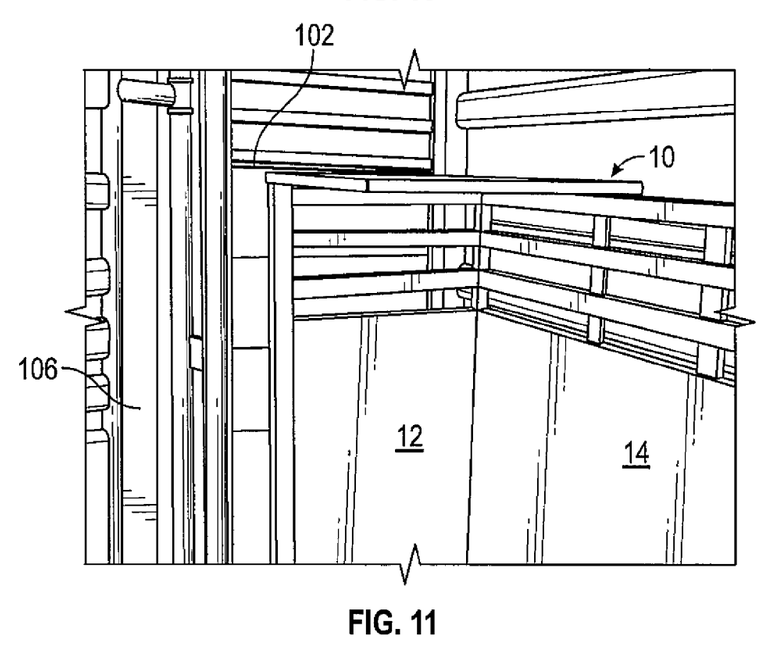
FIG. 11 shows an embodiment of the disclosed invention disposed inside the chute depicted in FIG. 1.
Figure 12:
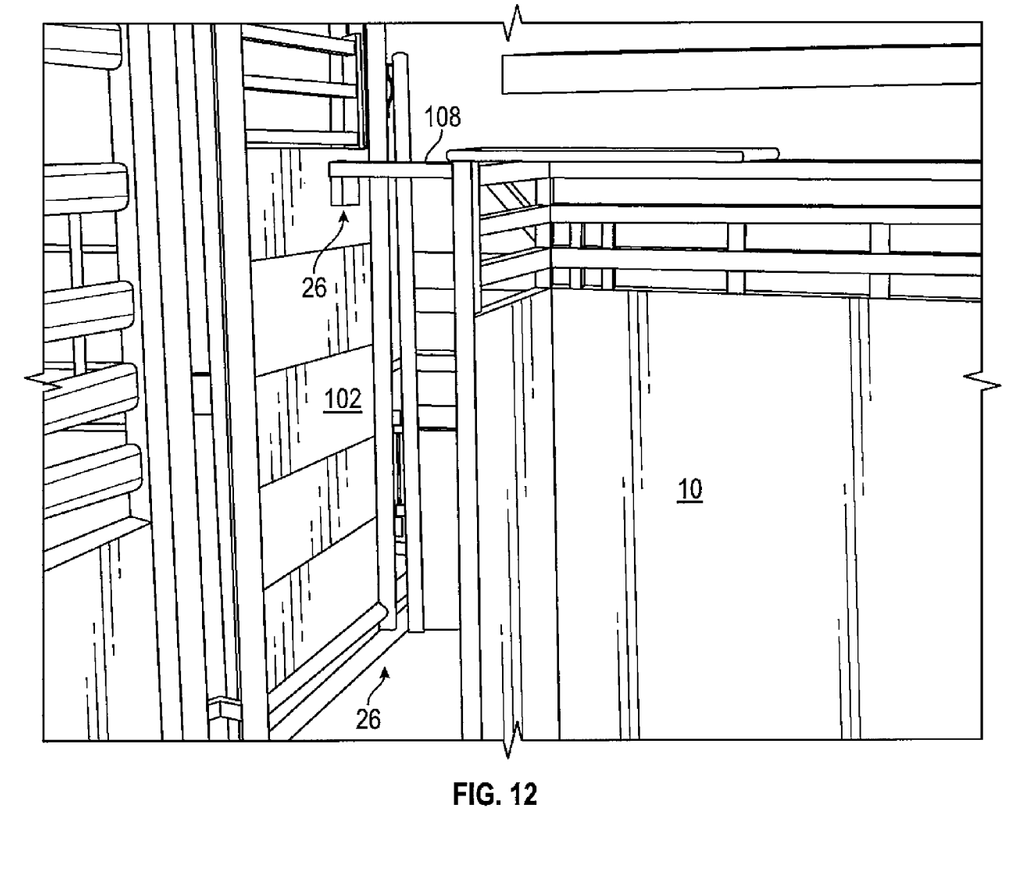
FIG. 12 shows a second view of an embodiment of the disclosed invention disposed inside the chute depicted in FIG. 1.

FIGS. 11 and 12 show an embodiment of the insert 10 placed within a chute 100, where the first side 106 of the chute is in the open position. It is to be noted that front member 12 is abutted against front 102 and maintained in that position by spacer member 26. The adjustable hangers 22 are utilized to attach the portable insert 10 to the second side 108 of the chute 100, while spacing members 24 maintain the position of side member 14 with respect to second side 108. Because of the rigid construction of the insert 10, spacing members 24 and 26 serve to maintain the entire insert in fixed position within the chute 100.

Figure 13:
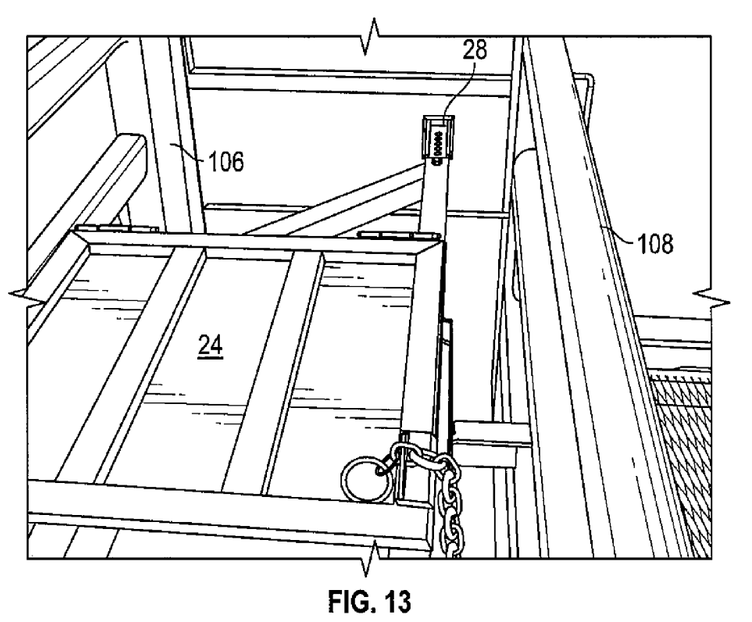
FIG. 13 shows a partial view, looking downwardly, of an embodiment of the disclosed invention disposed inside the chute depicted in FIG. 1.

FIG. 13 shows how adjustable hangers 22 hang the insert 10 onto the second side 108 and how the front portion 28 of spacer member 26 is utilized to maintain the position of insert 10 with respect to the front 102 of the chute 100. FIG. 13 shows the first side 106 of the chute 100 in a closed position. FIG. 13 also shows optional lid member 24 in a closed position. As shown in FIG. 13, various means may be utilized for securing lid 24 in the closed position, such as a chain and catch configuration.

Figure 14:
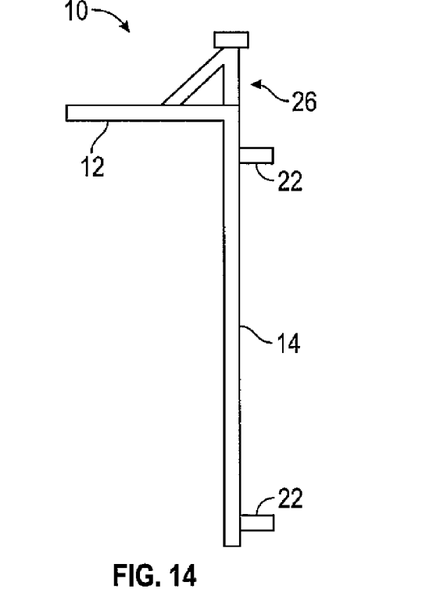
FIG. 14 schematically shows a top view of an embodiment of the disclosed invention.

FIG. 14 schematically shows a plan view of insert 10, showing the relative positions of the front member 12, the side member 14, spacer member 26 and adjustable hangers 22.

While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following appended claims.

What is claimed is:

1. A portable insert in combination with an animal release chute, the animal release chute comprising a front, a back, a first side and a second side, wherein a four-legged animal may be placed within the release chute with the animal's head facing the front, wherein the first side is pivotally attached to the front or to the back, and the first side may be pivoted from a first closed position in which the first side is parallel to the second side and the animal is confined within the pen to a second open position in which the first side is not parallel to the second side and an opening is formed through which the animal may exit the release chute, the portable insert comprising:
    a front panel member which is disposed parallel and adjacent to the front;
    a side panel member attached to the front panel member at an approximate right angle, wherein the side member is disposed parallel and adjacent to the second side;
    a spacing member extending forwardly from the front panel member, where the spacing member comprises a front portion which is positioned into engaging contact with the front, the spacing member is maintained in a fixed position with respect to the front such that the spacing member rigidly maintains the portable insert in position with respect to the front and back; and
    a support hanger attached to an upper portion of the side panel member attaches the side panel member to the second side.

2. The portable insert of claim 1 further comprising a lid member pivotally attached to the front panel member.

3. The portable insert of claim 1 wherein the support hanger comprises adjustable hangers which allow the portable insert to be vertically repositioned with respect to the animal release chute.

* * * * *